Feb. 24, 1942.  J. L. OSBORNE  2,274,456
METHOD OF MAKING CALCIUM THIOCYANATE
Filed July 21, 1939
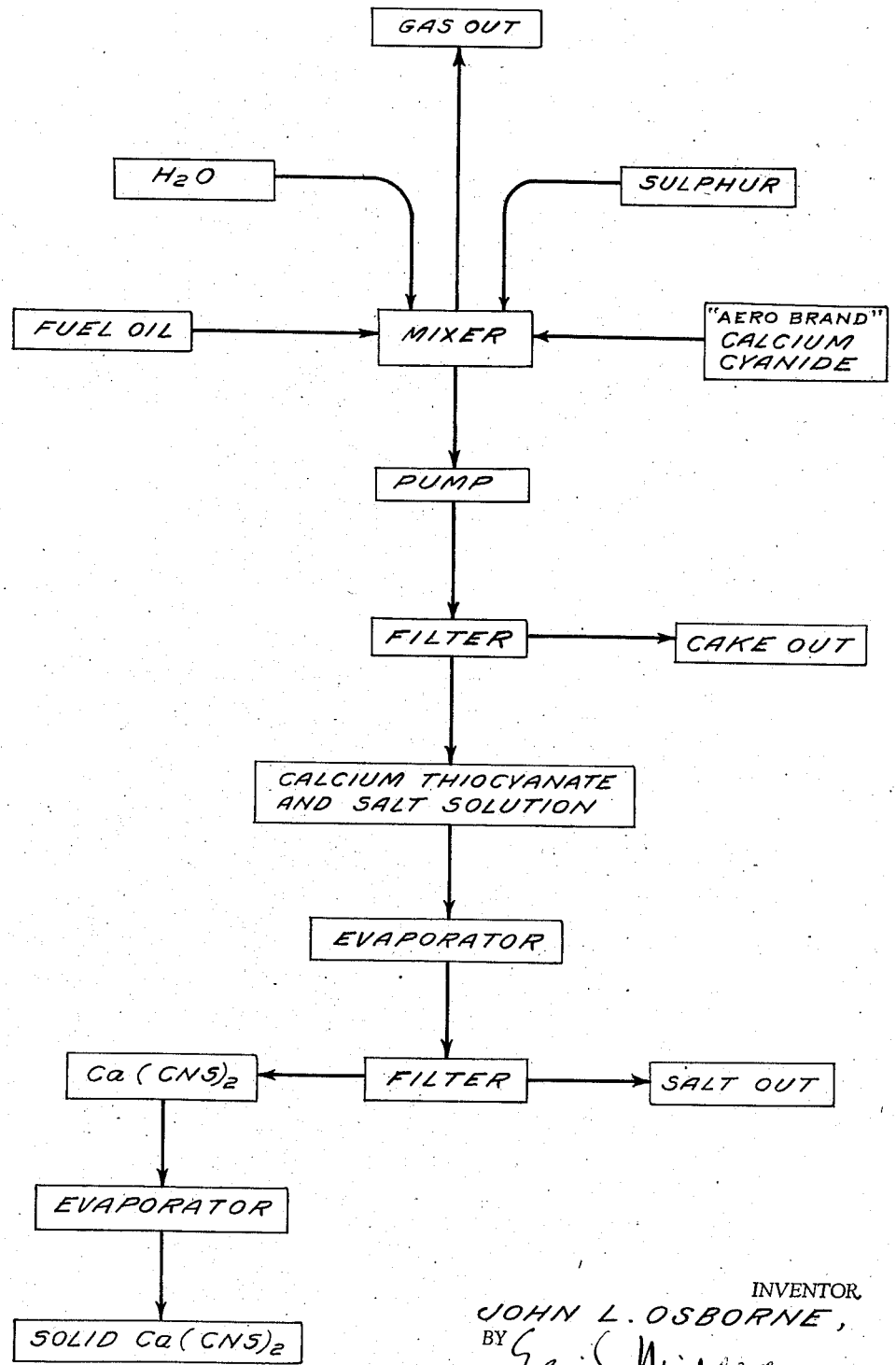
INVENTOR.
JOHN L. OSBORNE,
BY
ATTORNEY.

UNITED STATES PATENT OFFICE 2,274,456

METHOD OF MAKING CALCIUM THIOCYANATE

John L. Osborne, Elizabeth, N. J., assignor to American Cyanamid Company, New York, N. Y., a corporation of Maine Application July 21, 1939, Serial No. 285,668

5 Claims. (Cl. 23—75)

The present invention relates to a method of preparing calcium thiocyanate, either in solid or liquid form or admixtures of the same with sodium chloride.

There is on the market today a composition known as "Aerobrand" calcium cyanide which consists predominantly of calcium cyanide, sodium chloride, lime, graphite and other impurities. This composition, hereinafter referred to as "calcium cyanide," forms a convenient raw material for the manufacture of the calcium thiocyanate or calcium thiocyanate-sodium chloride mixture.

The invention contemplates in one of its broadest aspects the slurrying of finely divided sulfur in water with the addition of calcium cyanide to form calcium thiocyanate in solution. The slurry is then filtered to remove insolubles, such as lime, graphite, silica, etc., and the resulting solution contains approximately 25% calcium thiocyanate and 10% sodium chloride.

Where higher concentrations of calcium thiocyanate are desired, the solution may be evaporated, whereupon sodium chloride separates. By repeating this operation, the sodium chloride may be completely removed and the calcium thiocyanate recovered as a solid product.

Referring now to the flow sheet which illustrates diagrammatically the method of this invention, a mixer of the Stokes or other type is shown, into which are fed 3.3 parts of ground sulfur in 23 parts of water, with agitation until the sulfur is fairly wet. To this wetted sulfur are then added ten parts of calcium cyanide, preferably "Aerobrand" calcium cyanide. In order to prevent foaming, it is desirable to add a small amount of heavy fuel oil or the like, which forms a film on the surface. The temperature of the mix is then brought to 80–100° C., if it has not already reached that point and pumped to a filter of the Oliver or other type. The cake, consisting predominantly of lime, graphite and silica or the like, is rejected. The filtrate is an aqueous solution containing approximately 25% calcium thiocyanate and 10% sodium chloride. This product is useful as such for killing vegetation and for other purposes.

Where a higher concentration of calcium thiocyanate is desired, the solution may be evaporated until a part or all of the salt is precipitated, due to its lesser solubility. After removal of the salt, evaporation may be continued to the point where the calcium thiocyanate may be obtained as a solid product.

While the invention has been shown and described with specific reference to particular embodiments, it is to be understood that it is not to be limited thereto but is to be construed broadly and restricted solely by the scope of the appended claims.

I claim:

1. A method of making calcium thiocyanate which consists in slurrying together sulfur, calcium cyanide and water, raising the temperature to from 80 to 100° C.

2. A method of producing a solution of calcium thiocyanate which includes slurrying sulfur and a composition including calcium cyanide, sodium chloride, lime and graphite, with water, raising the temperature to a point between 80 and 100° C. and filtering off the insolubles.

3. The method of claim 2 in which a quantity of heavy fuel oil is added to the magma during the slurrying operations to prevent foaming.

4. The method of claim 2 in which the final aqueous filtrate is evaporated to remove at least a part of the sodium chloride.

5. The method of claim 2 in which the final aqueous solution is evaporated until all of the sodium chloride has been precipitated, separating the sodium chloride from the concentrated calcium thiocyanate solution and evaporating the latter to dryness.

JOHN L. OSBORNE.